US007649574B2

(12) United States Patent
Toyooka

(10) Patent No.: US 7,649,574 B2
(45) Date of Patent: Jan. 19, 2010

(54) IMAGE DISPLAY METHOD AND DEVICE, AND PROJECTOR

(75) Inventor: Takashi Toyooka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 797 days.

(21) Appl. No.: 11/296,358

(22) Filed: Dec. 8, 2005

(65) Prior Publication Data

US 2006/0125841 A1 Jun. 15, 2006

(30) Foreign Application Priority Data

Dec. 10, 2004 (JP) ............................ 2004-358117

(51) Int. Cl.
*H04N 11/06* (2006.01)
*H04N 5/57* (2006.01)

(52) U.S. Cl. ....................... 348/744; 348/488; 348/577; 348/607; 348/663; 348/687

(58) Field of Classification Search ................. 348/488, 348/489, 490, 577, 587, 744, 606, 607, 610, 348/631, 663, 668, 687; 345/589–605, 637, 345/639, 691
See application file for complete search history.

(56) References Cited

U.S. PATENT DOCUMENTS 5,654,773 A * 8/1997 Kajimoto et al. ............ 348/717
5,982,432 A * 11/1999 Uenoyama et al. ..... 375/240.01
6,462,786 B1 * 10/2002 Glen et al. .................. 348/599
6,573,951 B1 * 6/2003 Hewlett et al. ............. 348/770
6,903,710 B2 * 6/2005 Ooe et al. ..................... 345/63
7,057,668 B2 * 6/2006 Herrmann ................... 348/554
7,123,222 B2 * 10/2006 Borel et al. ................... 345/88
2003/0193487 A1 * 10/2003 Yatsuda et al. .............. 345/204
2005/0237433 A1 * 10/2005 Van Dijk et al. ............ 348/702
2006/0119546 A1 * 6/2006 Otsuka et al. ................. 345/68
2007/0097017 A1 * 5/2007 Widdowson et al. ......... 345/1.3
2007/0132680 A1 * 6/2007 Kagawa et al. ................ 345/84
2007/0146509 A1 * 6/2007 Hekstra et al. .............. 348/253
2008/0158431 A1 * 7/2008 Russell ....................... 348/712
2008/0284881 A1 * 11/2008 Ikizyan et al. .............. 348/258

FOREIGN PATENT DOCUMENTS

JP A 2002-351382 12/2002
WO WO-03/046879 * 6/2003

* cited by examiner

*Primary Examiner*—Brian P Yenke
(74) *Attorney, Agent, or Firm*—Oliff & Berridge, PLC

(57) ABSTRACT

An image display method of splitting a frame into a plurality of sub frames by multiplying a frame frequency of an incoming image signal by an integer, and dividing an image that is originally for the frame into pieces for display on the sub frames. In the image display method, the luminance component included in the image is given a priority for display on a first sub frame that is at least one of the sub frames, and a color-difference component included in the image is given a priority for display on a second sub frame that is also one of the sub frames but not the first sub frame.

7 Claims, 11 Drawing Sheets

IMAGE DISPLAY METHOD AND DEVICE, AND PROJECTOR

CROSS-REFERENCE TO RELATED APPLICATION

The present application claims priority to Japanese Patent Application No. 2004-358117 filed Dec. 10, 2004, which is hereby expressly incorporated by reference herein in its entirety.

BACKGROUND

1. Technical Field

The present invention relates to image display methods, devices, and projectors.

2. Related Art

Image display devices such as television receivers display images on a frame basis. Object images are animated by being displayed with a slight image displacement on a frame basis with a frame frequency of 60 Hz, for example. As such, the object is put in motion in the images.

In FIGS. 8 and 11, both (a) show display images of a moving object on a frame basis, and the vertical axis indicates time. In FIGS. 8 and 11, both (b) show how the display images look if a user's eyes follow the moving object.

FIG. 8 shows a case with an impulse-type image display device exemplified by a CRT or others. As shown in (a) in FIG. 8, with an impulse-type image display device, images of a moving object appear impulsively for every frame. This thus reduces, as shown in (b) in FIG. 8, a motion blur streak 70 observed to the image contour is reduced in width even if a user's eyes follow the moving object.

FIG. 9 shows a case with a hold-type image display device exemplified by a liquid crystal display or others. As shown in (a) in FIG. 9, with a hold-type image display device, images of a moving object are continuously displayed for every frame. With such image display, a contour position 72 of the moving object greatly changes at regular intervals. As a result, as shown in (b) in FIG. 9, when a user's eyes follow the moving object, the motion blur streak 70 observed to the image contour is increased in width.

In the natural world, the motion blur streak is reduced in width when a person follows a moving object with his or her eyes. In this sense, there has been a demand for the hold-type image display device such as liquid crystal display to achieve such visual characteristics as FIG. 8.

To meet such a demand, for example, Patent Document 1 (JP-A-2002-351382) is proposing a method for impulsive image display in a hold-type image display device as in an impulse-type image display device. Also proposed thereby is a method, for image display, of doubling a frame frequency of input image signals, and inserting generated image signals between any consecutive input image signals.

FIG. 10 shows a case with impulsive image display in a hold-type image display device. In such a case, as shown in (a) in FIG. 10, a black period is inserted to each of the image frames. As a result, as shown in (a) in FIG. 10, the motion blur streak 70 observed to the image contour is reduced in width for the moving object.

FIG. 11 shows a case with image display with generated image signals inserted between any consecutive input image signals. In this case, as shown in (a) in FIG. 1, used for insertion between any two input image signals are generated image signals intermediate for the consecutive input image signals. This accordingly reduces the change level of the contour position 72 of the moving object, and as shown in (b) in FIG. 1, the motion blur streak 70 observed to the image contour is reduced in width for the moving object.

The issue here is that such a method of impulsive image display in a hold-type image display device causes a problem of lowering the image intensity due to inserted black periods compared with any conventional hold-type image display devices.

The method of doubling a frame frequency of input image signals, and inserting generated image signals for image display causes another problem of increasing the signal processing load. This is because, for such a method, there needs to accurately capture the movement of the moving object to calculate a motion vector or others for generating any new image signals. Thus generated image signals are expected to be high in precision because if any error is observed in the resulting image signals, image flickering will be caused.

SUMMARY

An advantage of some aspects of the present invention is to free display images from motion blur streaks while preventing the signal processing load from increasing in hold-type image display device.

An aspect of the invention is directed to an image display method of splitting a frame into a plurality of sub frames by multiplying a frame frequency of an incoming image signal, and dividing an image that is originally for the frame into pieces for display on the sub frames. In the image display method, a luminance component included in the image is given a priority for display on a first sub frame that is at least one of the sub frames, and a color-difference component included in the image is given a priority for display on a second sub frame that is also one of the sub frames but not the first sub frame.

Another aspect of the invention is directed to an image display device that includes: a frame converter that splits a frame into a plurality of sub frames by multiplying a frame frequency of an incoming image signal; and a display device that displays an image on the divided sub frames as a result of frame split by the frame converter. The image display device further includes a selection unit that causes the display device to display a luminance component included in the image with a priority on a first sub frame that is at least one of the sub frames, and makes the display device display a color-difference component in the image with a priority on a second sub frame that is also one of the sub frames but not the first sub frame.

According to such image display method and device, the luminance component in the image is displayed with a priority on the first sub frame, which is at least one of the sub frames. On the second sub frame that is also one of the sub frames but not the first sub frame, the color-difference component in the image is displayed with a priority.

In human brains, image light coming through eyes is separated into luminance components and color-difference components for processing. It is known that the luminance components greatly contribute for humans to perceive movement in the outside world. The image display method and device according to the aspects of the invention are utilizing such a fact to reduce the motion blur streaks when a person follows a moving object with his or her eyes. More in detail, images with a priority for luminance components are to be displayed impulsively by being separately displayed from images with a priority for color-difference components. In such a manner, the effects similar to a case of impulsive black display can be achieved while the luminance is prevented from lowering in an entire frame. What is more, with the image display method and device according to the aspects of the invention, image signals coming from outside are each separated into the luminance components and the color-difference components so that image display can be eased with distinction between images with a priority for the luminance components and those with a priority for the color-difference components. This accordingly eliminates the need to accurately capture the movement of a moving object in display images to calculate a motion vector or others for generating any new image signals, thereby preventing an increase of the signal processing load.

As such, according to the image display method and device of the aspects of the invention, it is possible in hold-type image display devices to free display images from motion blur streaks while preventing the signal processing load from increasing.

In the image display method according to the aspect of the invention, it is preferable to take such a configuration that, when a luminance signal level of the image displayed on the first sub frame is of a maximum displayable level or higher, the luminance components exceeding the maximum displayable level are put under the charge of the second sub frame for display.

Such a configuration enables to prevent the luminance from lowering in an entire frame so that the image display method can show more excellent display properties.

In the image display device according to the aspect of the invention, as a specific alternative configuration, the selection unit may serve as a control section that divides the image signal into a luminance component priority signal including a high proportion of luminance components, and a color-difference-component priority signal including a high proportion of color-difference components, supplies the luminance component priority signal to the display device in the first sub frame that is at least one of the sub frames, and supplies the color-difference-component priority signal to the display device in the second sub frame that is also one of the sub frames but not the first sub frame.

In a case where the display device serves as an illumination light modulation display device that displays the image through modulation of illumination light, alternatively, the selection unit may include: a filter that has a luminance component priority region in which a luminance component of the illumination light is guided with a priority, and a color-difference-component priority region in which a color-difference component of the illumination light is guided with a priority; and a drive section that drives the filter for the intensity-component priority region or the color-difference-component priority region of the filter to guide the illumination light based on the sub frames.

In the image display device according to the aspect of the invention, in a case where the control section is provided to serve as the selection unit, it is preferable that, when the luminance of the image displayed on the first sub frame is of a maximum displayable level by the display device or higher, the control section adds the intensity components exceeding the maximum displayable level to the color-difference-component priority signal.

Such a configuration enables to prevent the luminance from lowering in an entire frame so that the image display method can show more excellent display properties.

Another aspect of the invention is directed to a projector that includes the image display device of the invention.

According to the image display device of the aspect of the invention, it is possible in hold-type image display devices to free display images from motion blur streaks while preventing the signal processing load from increasing. In this sense, the projector according to the aspect of the invention can show excellent display properties.

BRIEF DESCRIPTION OF THE DRAWINGS

The invention will be described with reference to the accompanying drawings, wherein like numbers reference like elements.

DESCRIPTION OF EXEMPLARY EMBODIMENTS

In the below, by referring to the accompanying drawings, described are image display method and device, and a projector according to embodiments of the present invention.

First Embodiment

Figure 1:
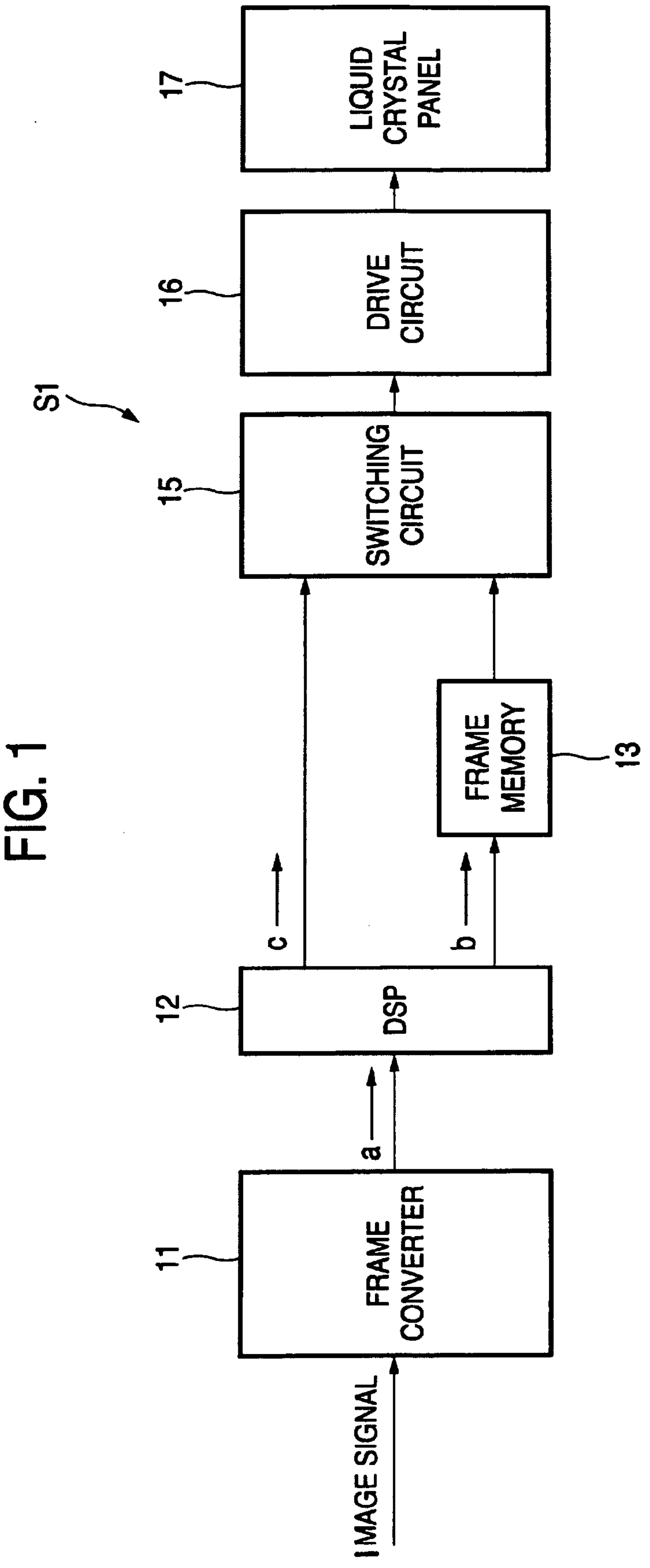
FIG. 1 is a block diagram showing an image display device of a first embodiment of the invention.

FIG. 1 is a block diagram showing the function configuration of an image display device S1 of a first embodiment. As shown in FIG. 1, the image display device S1 of the present embodiment is configured to include a frame converter 11, a Digital Signal Processor (DSP) 12, frame memory 13, a switching circuit 15, a drive circuit 16, and a liquid crystal panel 17.

The frame converter 11 serves to split a frame into two sub frames by doubling a frame frequency of 60 Hz, i.e., 120 Hz, of an image signal coming from outside, for example. In the below, an image signal as a result of frame conversion by the frame converter 11, i.e., an image signal coming from the frame converter 11, is referred to as original signal a.

The DSP 12 serves to separate the original signal a into a luminance-component priority signal b that includes a high proportion of luminance components, and a color-difference-component priority signal c that includes a high proportion of color-difference components. When the drive circuit 16 receives the luminance-component priority signal b, the intensity becomes higher compared with a case of receiving the original signal a, i.e., the liquid crystal panel 17 displays thereon an luminance-prioritized image. On the other hand, when the drive circuit 16 receives the color-difference-component priority signal c, the intensity becomes lower compared with a case of receiving the original signal a, i.e., the liquid crystal display 17 displays thereon a color-difference-prioritized image.

Described next is a method of generating such luminance-component priority signal b and color-difference-component priority signal c. Assuming here is a case where the original signal a is a YCbCr signal. To generate an luminance-component priority signal b, the DSP 12 first converts Y (luminance) of the YCbCr signal into an RGB signal. The DSP 12 then replaces the luminance components of the YCbCr signal with 0, and converts the resulting 0CbCr signal into an R'G'B' signal. As to an R-R' G-G' B-B' signal, the DSP 12 doubles the number of bits for the respective components, i.e., R-R' signal, G-G' signal, and B-B' signal, so that an luminance-component priority signal b is generated. As such, to generate an luminance-component priority signal b, a signal derived by subtracting an R'G'B' signal from an RGB signal is used as a basis. Herein, the RGB signal is including both luminance components and color-difference components, and the R'G'B' signal is including only the color-difference components in which the luminance-components are replaced by 0. As a result, the resulting luminance-component priority signal b includes a high proportion of luminance components of any incoming original signal a. On the other hand, to generate a color-difference-component priority signal c, the DSP 12 doubles the number of bits for the respective components of an R'G'B' signal, i.e., R' signal, G' signal, and B' signal. As such, used as a basis to generate a color-difference-component priority signal c is an R'G'B' signal, including only color-difference components with luminance components replaced by 0. As a result, the resulting color-difference-component priority signal c includes a high proportion of color-difference components of any incoming original signal a.

The reason for doubling the tones of R-R' signal, G-G' signal, B-B' signal, R' signal, G' signal, and B' signal is that a frame is split into two sub frames in the image display device of the present embodiment. More in detail, to display on one of the sub frames the luminance or the color difference of the entire frame, there is required to display the luminance or the color difference twice as that in the sub frame.

When an original signal a is an RGB signal, the DSP 12 calculates Y (luminance) from the RGB signal using the following equation 1. Thus calculated Y is subtracted each from the R, G, and B signals so that an R'G'B' signal is generated. Thereafter, similarly to a case where an original signal a is an YCbCr signal, an luminance-component priority signal b and a color-difference-component priority signal c are generated.

$$Y=0.299R+0.587G+0.144B \qquad \text{Equation 1}$$

Assumed here is a case where the maximum levels of the colors (RGB) of the liquid crystal panel 17 are MaxR, MaxG, and MaxB, respectively, and the number of bits of an luminance-component priority signal b exceeds the maximum levels, i.e., MaxR, Max G, and MaxB. In such a case, the DSP 12 equalizes the number of bits of the luminance-component priority signal b to the maximum level, and adds any luminance components exceeding the maximum level to a color-difference-component priority signal c. After such equalization and addition, the liquid crystal panel 17 displays images of the maximum level when the luminance-component priority signal b is input to the drive circuit 16 thereof. When the color-difference-component priority signal c is input to the drive circuit 16 of the liquid crystal panel 17, images based on the level added with the luminance components are displayed thereon.

The frame memory 13 is connected to the DSP 12, and serves to store a signal coming from the DSP 12, i.e., either an luminance-component priority signal b or a color-difference-component priority signal c, for a fixed length of time before output. In the image display device S1 of the present embodiment, the luminance-component priority signal b is forwarded to the frame memory 13. The length of time for the frame memory 13 to store the luminance-component priority signal b is so set as to establish timing synchronization, i.e., between timings when the switching circuit 15 receives an luminance-component priority signal b and a color-difference-component priority signal c.

The switching circuit 15 serves to alternately output (supply) incoming luminance-component priority signal b and color-difference-component priority signal c for every sub frame.

The drive circuit 16 serves to drive the liquid crystal panel 17 based on incoming luminance-component priority signal b and color-difference-component priority signal c. The drive circuit 16 is exemplified by a semiconductor IC chip directly incorporated to the liquid crystal panel 17, or a semiconductor IC chip incorporated to a circuit board that is conductively connected to the liquid crystal panel 17.

The liquid crystal panel 17 serves to display images by being driven by the drive circuit 16, and is a hold-type image display device.

In the present embodiment, the display device of the invention is configured by the drive circuit 16 and the liquid crystal panel 17, and the control section (selection unit) is configured by the switching circuit 15 and the DSP 12.

Described next is the operation in the image display device S1, i.e., image display method, of the present embodiment configured as such.

When the frame inverter 11 receives an image signal, the image signal is subjected to frame conversion so that an original signal a of a doubled frame frequency is generated. The original signal a is then forwarded from the frame converter 11 to the DSP 12. In the DSP 12, the original signal a is separated into an luminance-component priority signal b including a high proportion of luminance components, and a color-difference-component priority signal c including a high proportion of color-difference components. The resulting priority signals b and c are output from the DSP 12 in each different path.

The color-difference-component priority signal c coming from the DSP 12 is input to the switching circuit 15. The luminance-component priority signal b coming from the DSP 12 is forwarded to the frame memory 13 for temporary storage therein, and is output to the switching circuit 15 at the same time when the color-difference-component priority signal c is forwarded to the switching circuit 15.

The luminance-component priority signal b and the color-difference-component priority signal c provided to the switching circuit 15 as such are alternately output and forwarded to the drive circuit 16 on a sub frame basis by the switching circuit 15. As such, with the image display device of the present embodiment, a sub frame preceding to any others, i.e., first sub frame, displays images in which luminance components are given priority, and a subsequent sub frame, i.e., second sub frame, displays images in which color-difference components are given priority. More specifically, with the image display device and method of the present embodiment, the liquid crystal panel 17 performs image display on a sub frame basis, i.e., alternately between images in which luminance components are given priority, and images in which color-difference components are given priority. In this manner, when a plurality of images are displayed on the liquid crystal panel 17 in a successive manner, images in which the luminance components are given priority are to be displayed impulsively.

As described above, in human brains, image light coming through eyes is separated into luminance components and color-difference components for processing. The image display method and device of the present embodiment are utilizing such a fact to reduce the motion blur streaks when a person follows a moving object with his or her eyes. More in detail, images with a priority for luminance components can be displayed impulsively by being separately displayed from images with a priority for color-difference components. In such a manner, the effects similar to a case of impulsive black display can be achieved. Moreover, instead of impulsive black display, displayed are images in which color-difference components are given priority. It thus becomes possible to free display images from motion blur streaks while preventing luminance reduction for an entire frame compared with a case of impulsive black display.

What is more, with the image display device and method of the present embodiment, the DSP 12 separates an original signal a into an luminance-component priority signal b and a color-difference-component priority signal c, and the resulting priority signals b and c are alternately output to the sub frames. Such a simple operation process can reduce motion blue streaks that are often observed to image contours when a person's eyes follow a moving object. Accordingly, there is no more need to accurately capture the movement of a moving object in display images to calculate a motion vector or others for generating any new image signals, thereby preventing an increase of the signal processing load compared with any other conventional image display devices.

As such, according to the image display device and method, it is possible in hold-type image display devices to free display images from motion blur streaks while preventing the signal processing load from increasing.

With the image display device and method of the present embodiment, when the number of bits of an luminance-component priority signal b exceeds the maximum tones, i.e., MaxR, Max G, and MaxB, the number of bits of the luminance-component priority signal b is equalized to the maximum tone, and any luminance components exceeding the maximum tone are added to a color-difference-component priority signal c. That is, any components exceeding the maximum tone are put under the charge of the color-difference-component priority signal c so that the luminance is reduced from lowering in an entire frame, thereby leading to more excellent display properties.

Figure 2:
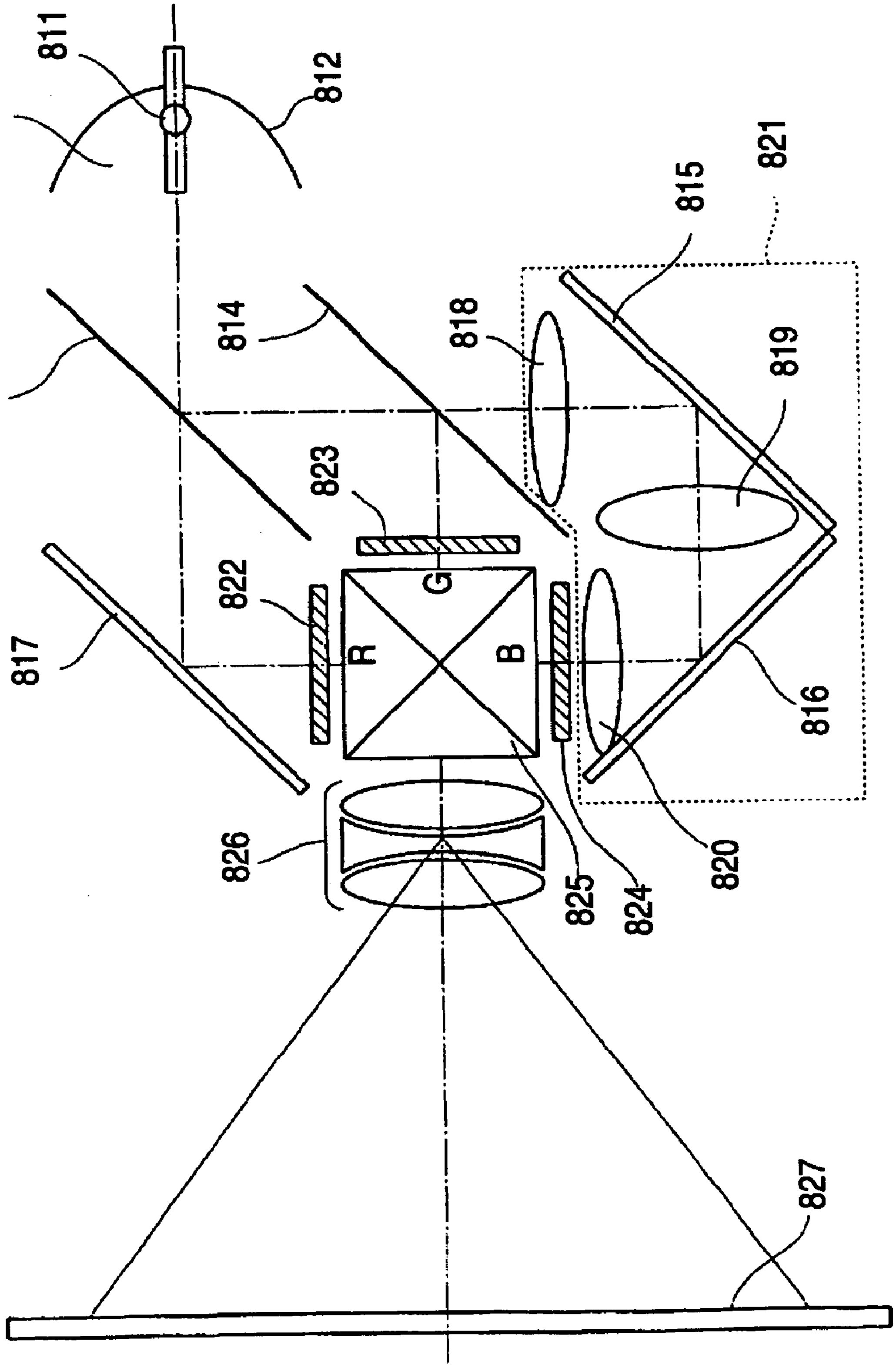
FIG. 2 is a diagram showing the schematic configuration of a projector that includes the image display device of the first embodiment.

By referring to FIG. 2, described next is a projector including the image display device of the present embodiment. FIG. 2 is a diagram showing the schematic configuration of main components of the projector. This projector is provided with optical modulation units 822, 823, and 824, all serving as the liquid crystal panel 17 of the above embodiment.

In FIG. 2, a reference numeral 810 denotes a light source, 813 and 814 each a dichroic mirror, 815, 816, and 817 each a reflective mirror, 818 a light-enter-side lens, 819 a relay lens, 820 a light-exit-side lens, 822, 823, and 824 each a light modulation unit configured by a liquid crystal panel, 825 a cross dichroic prism, and 826 a projection lens. The light source 810 is configured by a lamp 811 such as metal halide lamp, and a reflector 812 that reflects the light of the lamp.

The dichroic mirror 813 passes through red light components in white light coming from the light source 810, and reflects blue and green light components therein. The red light components passed through the dichroic mirror 813 are then reflected by the reflective mirror 817, and enter the optical modulation unit 822 that is specifically for the red light components. The green light components reflected by the dichroic mirror 813 are reflected again by the dichroic mirror 814, and then enter the optical modulation unit 823 that is specifically for the green light components. The blue light components reflected by the dichroic mirror 813 pass through the dichroic mirror 814. For such blue light components, a light guide unit 821 is specifically provided to prevent possible light loss due to their longer optical path. The light guide unit 821 is configured by a relay lens system, including the light-enter-side lens 818, the relay lens 819, and the light-exit-side lens 820. After going through such a light guide unit 821, the blue light components are entered into the optical modulation unit 824 that is specifically for the blue light components.

After modulated by each corresponding optical modulation units, the three color lights enter the cross dichroic prism 825, which is made of four right-angle prisms attached together. The interfaces of the right-angle prisms are formed with two dielectric multilayer films intersecting each other to be X in shape, i.e., a dielectric multilayer film that reflects any red light components, and a dielectric multilayer film that reflects any blue light components. With such dielectric multilayer films, three color light are combined together so that light of color images is formed. Thus formed light is projected onto a screen 827 by the projection lens 826 serving as a projection optical system, and on the screen 827, the images are enlarged and displayed.

The optical modulation units 822, 823, and 824 are each configured by the liquid crystal panel provided to the image display device of the above embodiment. The image display device of the present embodiment is capable of freeing display images from motion blur streaks while preventing the signal processing load from increasing. In this sense, the projector can show excellent display properties.

In the above embodiment, the optical modulation unit is exemplified by a translucent liquid crystal display device. This is surely not restrictive, and a reflective liquid crystal display device, a digital micro mirror device (DMD™), or others will do. Moreover, the image display device of the invention is applicable not only to the projection-type image display device such as projector as described above but also any other direct-view-type display devices. Such direct-view-type display devices are exemplified not only by liquid crystal display devices, but also by light-emission devices including organic EL (Electro-Luminescence) devices, inorganic EL devices, plasma display devices, electrophoretic display devices, display devices using electron emission elements, e.g., Field Emission Displays, and Surface-Conduction Electron-Emitter Displays, or others.

The electronic equipment including such direct-view-type display devices is specifically exemplified by mobile phones. The electronic equipment also includes IC cards, video cameras, personal computers, head mount displays, fax devices with display capabilities, digital camera finders, portable TVs, DSP devices, PDAs, electronic personal organizer, billboards, advertising displays, or others.

Second Embodiment

Described next is a second embodiment of the present invention by referring to FIGS. 3 to 6. In the below, any components similar to those in the first embodiment are not entirely or partially described again.

Figure 3:
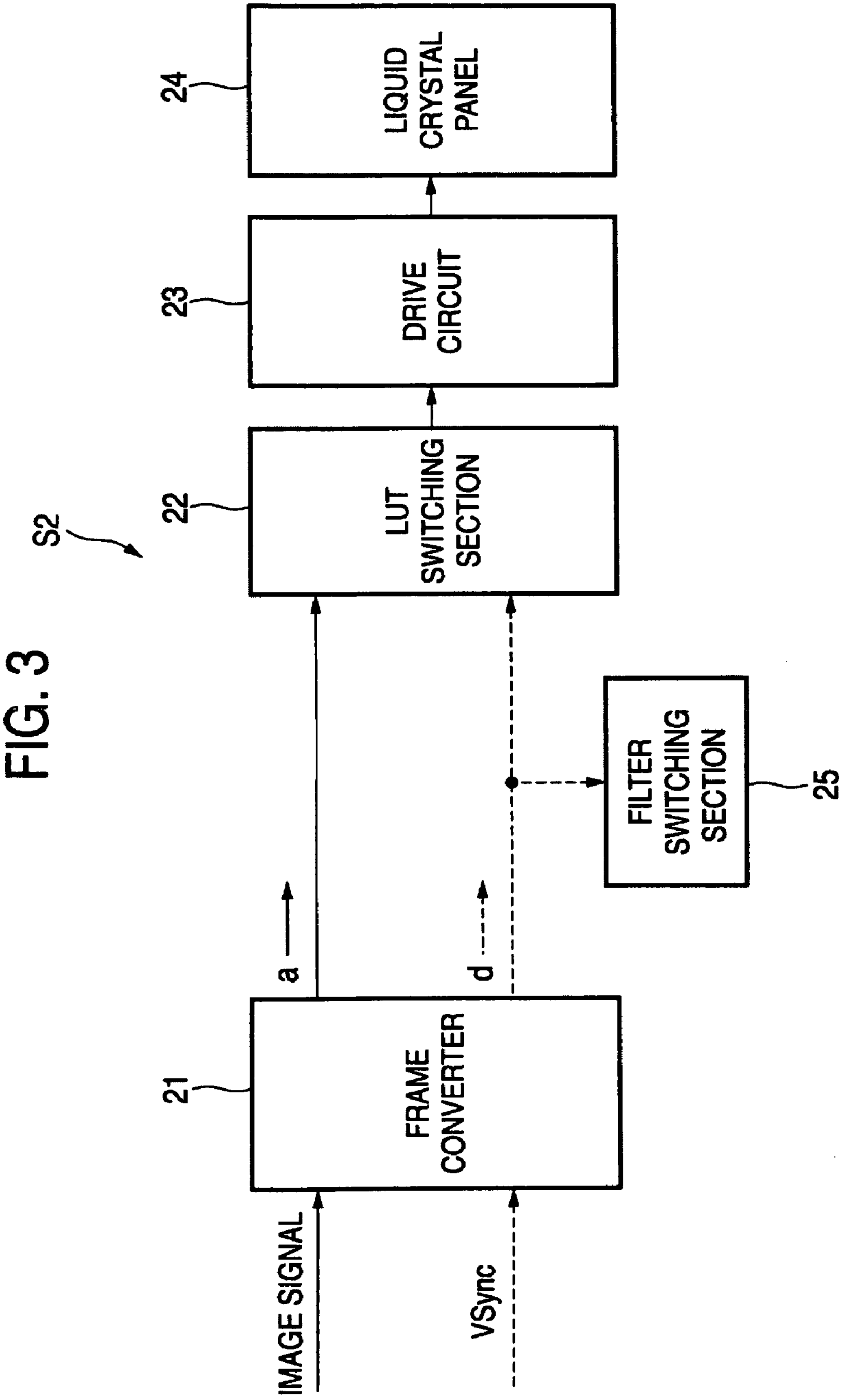
FIG. 3 is a block diagram showing an image display device of a second embodiment of the invention.

FIG. 3 is a block diagram showing the function configuration of an image display device S2 of the second embodiment. The image display device S2 is configured to include a frame converter 21, a Look Up Table (LUT) switching section 22, a drive circuit 23, a liquid crystal panel 24, and a filter switching section 25. The liquid crystal panel 24 of the image display device S2 of the second embodiment serves as an optical modulation display device that displays images through modulation of illumination light.

In the present embodiment, an image signal and a vertical synchronizing signal (Vsync) are forwarded to the frame converter 21. The image signal is the one generally generated on a frame basis with a frame frequency of 60 Hz. The frame is a unit for image display. The vertical synchronizing signal has a frame frequency of 60 Hz corresponding to the frame frequency. The resulting signal is referred to as vertical synchronizing signal d. In this embodiment, similarly to the first embodiment, the frame frequency is doubled for image display. The frame converter 21 thus subjects the vertical synchronizing signal d to frequency conversion to derive a signal of 120 Hz, and the image signal to frame conversion so that an original signal a is generated.

Thus generated original signal a and the vertical synchronizing signal d are forwarded to the LUT switching section 22. In the LUT switching section 22, a tone signal configuring the original signal a is converted into a drive level signal for the liquid crystal panel, i.e., signal corresponding to voltage application. For such conversion, a Look Up Table (LUT) is used as a basis. The LUT switching section 22 contributes to improve the color reproducibility in the liquid crystal panel 24.

The image signal and the vertical synchronizing signal as a result of conversion are forwarded to the drive circuit 23. Based on the vertical synchronizing signal, the drive circuit 23 provides the liquid crystal panel 24 with the image signal converted into the drive level signal. In this manner, the liquid crystal panel 24 displays images for optical modulation.

The vertical synchronizing signal coming from the frame converter 21 is forwarded to the filter switching section 25 (drive section). In the filter switching section 25, based on the doubled frame frequency in the vertical synchronizing signal, first and second filters of a rotating spectral filter (not shown) are switched on a sub frame basis.

Figure 4:
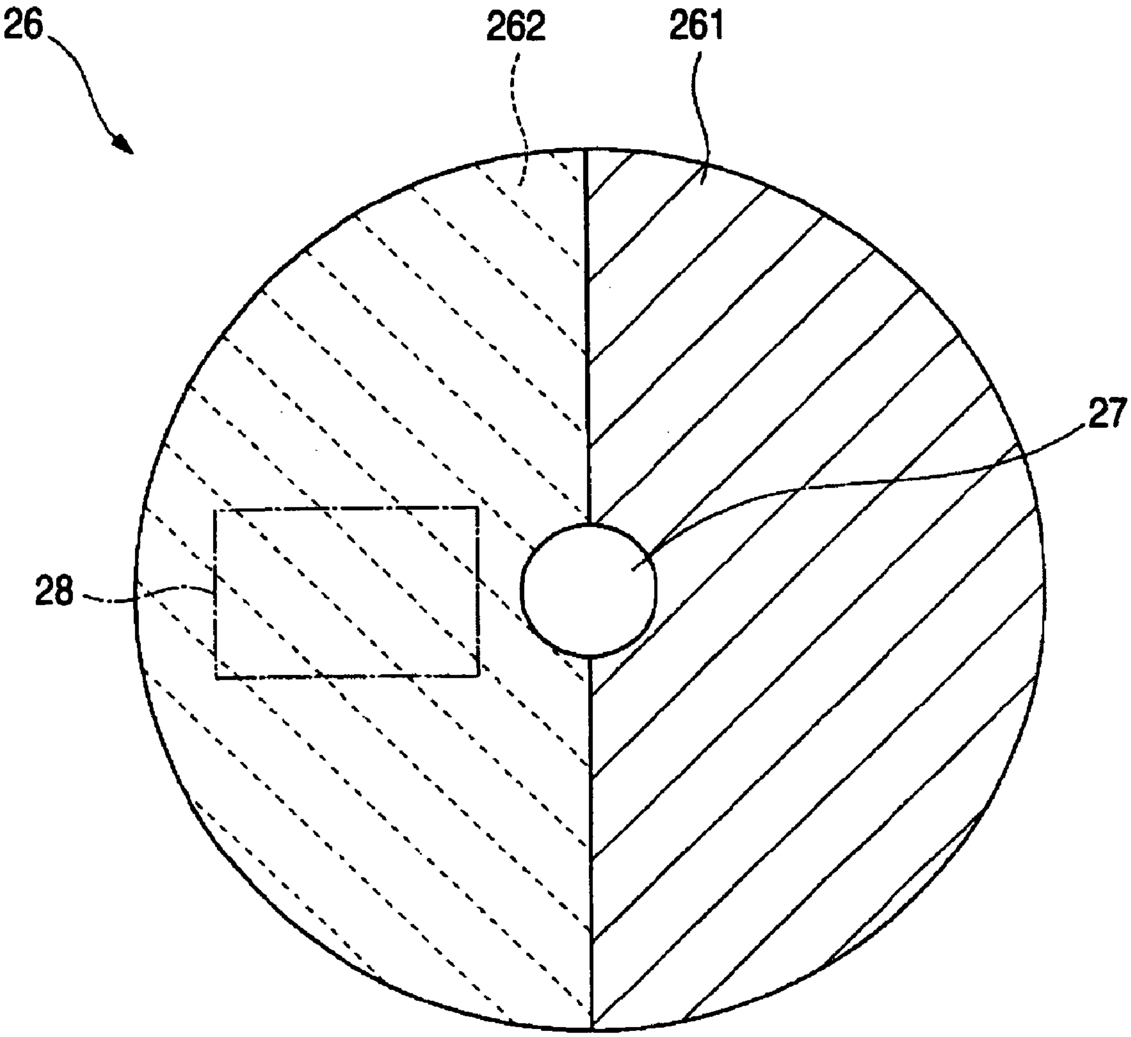
FIG. 4 is a front view of a rotating spectral filter.

FIG. 4 is a front view of a rotating spectral filter (filter) that is switched (driven) by the filter switching section 25. This rotating spectral filter is placed on the optical path of illumination light for illumination onto the liquid crystal panel 24. In the below, exemplified is a case with a rotating spectral filter 26 specifically for green light (illumination light). This rotating spectral filter 26 is so placed as to rotate about a center axis 27, and make the illumination light coming from a light source pass through a side portion 28 of the center axis 27.

The rotating spectral filter 26 includes two types of spectral filters 261 and 262, i.e., high color purity filters. These two spectral filters have each different spectral transmittance, and are placed in the circumferential direction. In the present embodiment, the first filter 261 is configuring an luminance-component priority region of the invention, and the second filter 262 is configuring a color-difference-component priority region of the invention.

Figure 5A:
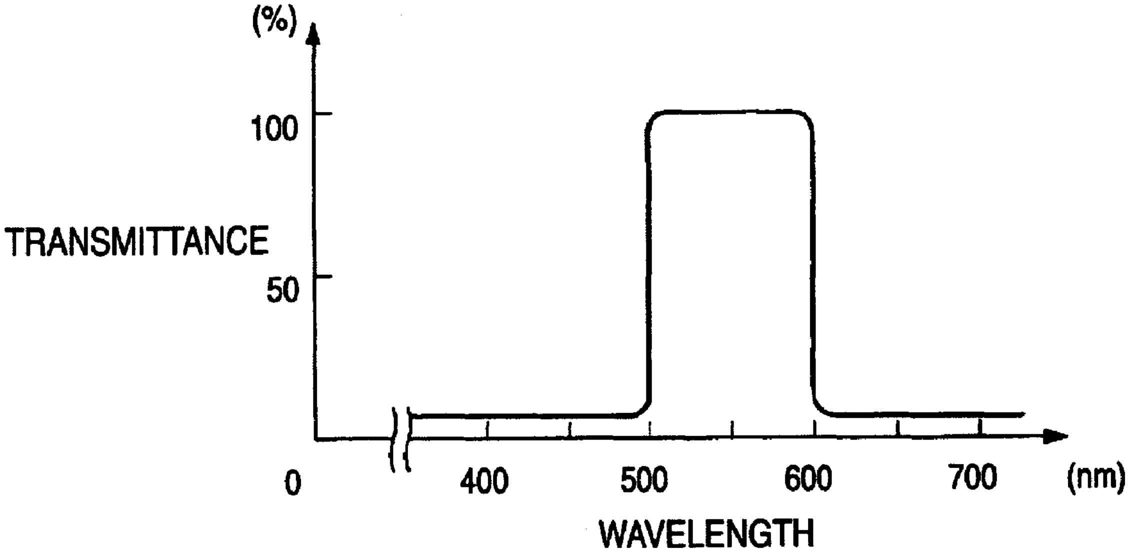
FIGS. 5A and 5B both show a spectral transmittance of filters configuring the rotating spectral filter.
Figure 5B:
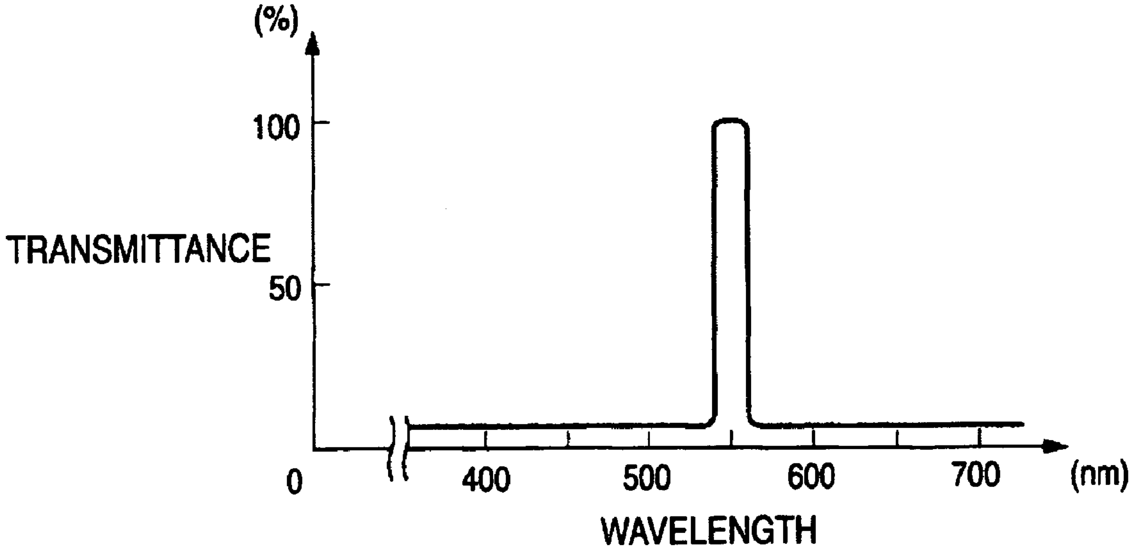

FIGS. 5A and 5B both show a spectral transmittance for the filters configuring the rotating spectral filter. In FIG. 5A, the spectral transmittance for the first filter is showing the transmittance of 100% in the wide wavelength range of about 550 nm. As a result, the first spectrum from the first filter includes light varying in wavelength, resulting in the spectral characteristics of high luminance but low saturation. More in detail, the first filter transmits (guides) the luminance components of the illumination light with a priority thereover. On the other hand, the spectral transmittance for the second filter of FIG. 5B is showing the transmittance of 100% in the narrow wavelength range of about 550 nm. As a result, the second spectrum from the second filter includes only light of wavelength of about 550 nm, resulting in the spectral characteristics of high saturation but low luminance. More in detail, the second filter transmits (guides) the color-difference components of the illumination light with a priority thereover. The first spectrum becomes thus higher in luminance than the second spectrum, and the second spectrum becomes high in saturation than the first spectrum.

Similarly, the rotating spectral filter of FIG. 1 specifically for the red light is provided with two filters showing the transmittance of 100% in the wavelength range of about 440 nm. The rotating spectral filter specifically for the blue light is provided with two filters showing the transmittance of 100% in the wavelength range of about 700 nm.

According to such an image display device S2 of the second embodiment configured as such, the filter switching section 25 sequentially switches the rotating spectral filter, i.e., between the first filter and the second filter, on a sub frame basis. The liquid crystal panel 24 is thus exposed to the higher-luminance first spectrum and the higher-saturation second spectrum on a sub frame basis. As a result, when the liquid crystal panel 24 is exposed to the first spectrum, displayed are images in which the luminance components are given priority. When the liquid crystal panel 24 is exposed to the second spectrum, displayed are images in which the color-difference components are given priority. Accordingly, also in the image display device S2 of the second embodiment, the images in which the luminance components are given priority appear impulsively so that the effects similar to those achieved by the image display device S1 of the first embodiments can be also achieved.

In the second embodiment, the selection unit of the invention is configured by the rotating spectral filter, and the filter switching section 25.

By referring to FIG. 6, described next is a projector including the image display device of the present embodiment.

Figure 6:
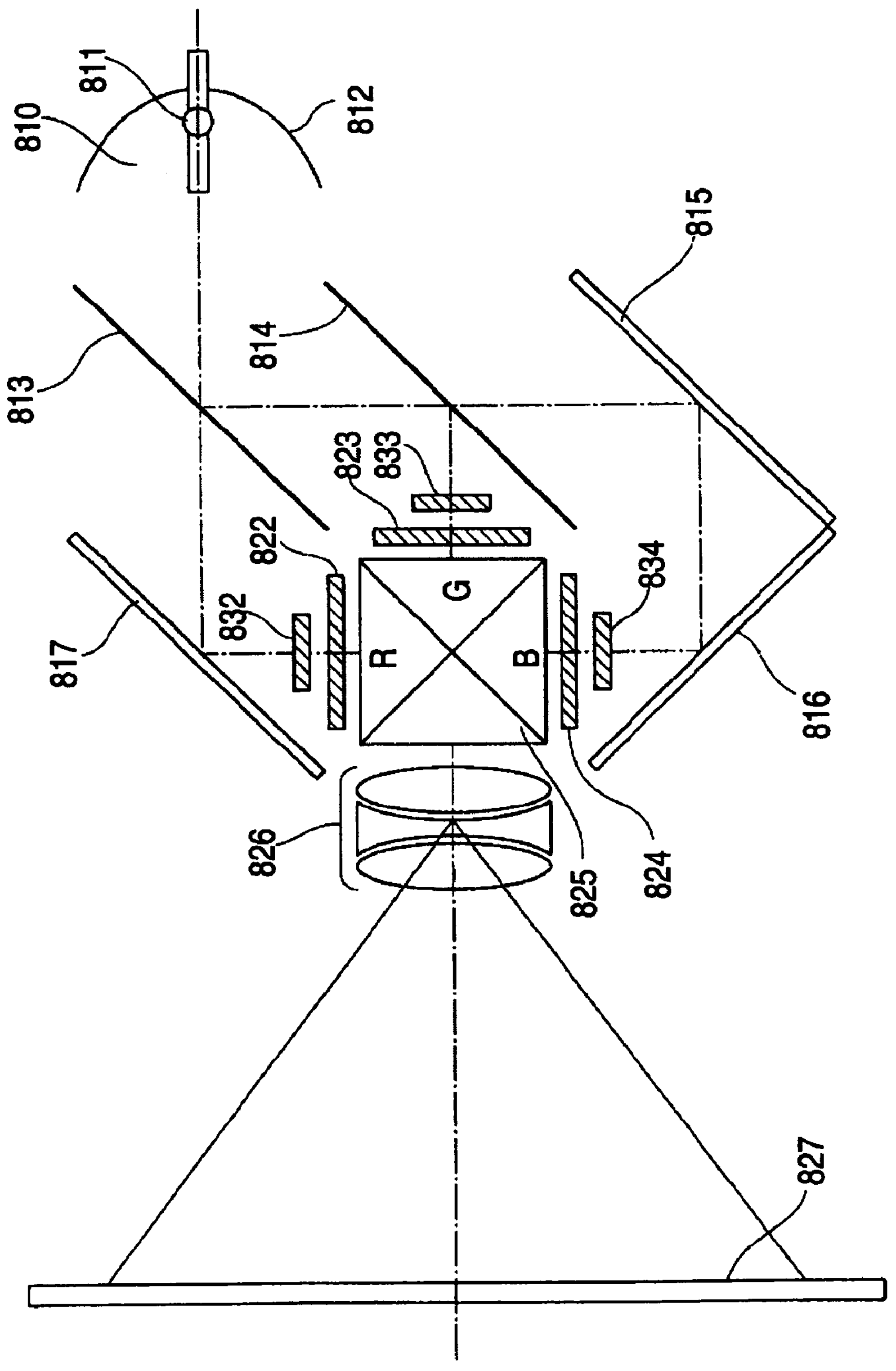
FIG. 6 is a diagram showing the schematic configuration of a projector that includes the image display device of the second embodiment.

FIG. 6 is a diagram showing the schematic configuration of a projector including the image display device of the second embodiment. In FIG. 2, any components similar to those of the projector including the image display device of the first embodiment are provided with the same reference numeral, and not entirely or partially described again.

As shown in FIG. 6, the projector including the image display device of the second embodiment is configured to include rotating spectral filters 832, 833, and 834 on the optical path for each of the color lights. Herein, these rotating spectral filters 832, 833, and 834 each serve as the rotating spectral filter provided to the image display device. The projector also includes optical modulation units 822, 823, and 824, each of which serves as the liquid crystal panel 24 provided to the image display device of the second embodiment.

According to the image display device of the second embodiment, it becomes possible to free display images from motion blur streaks while preventing the signal processing load from increasing. Accordingly, the projector can show excellent display properties.

In FIG. 6, the rotating spectral filters 832, 834, and 834 are placed on the light source side of the optical modulation units 822, 823, and 824. Such a configuration is not surely restrictive, and the position of such rotating spectral filters is not an issue as long as being placed on the optical path for the three primary colors. In the above description, the spectral transmittance of the first filter of the rotating spectral filter 833 for the green light is presumed as being 100% in the wavelength range of 500 nm to 600 nm. Alternatively, when the primary color lights are separated with precision by the dichroic mirror, the spectral transmission of the first filter may have the transmittance of substantially 100% (transparent) in the wavelength range, i.e., at least entire visible range. This is true also to the rotating spectral filters 832 and 834 for the red and blue lights, respectively.

While the preferred embodiments of the present invention have been described above in detail, it is understood that numerous other modifications and variations can be devised for those embodiments without departing from the technical idea and the scope of the invention. That is, the specific materials and configurations described in the embodiments are no more than examples, and are to be modified as appropriate.

For example, in the above embodiments, a single frame is split into two sub frames by doubling the frame frequency of an incoming image signal by the frame converter 11. This is surely not restrictive, and a single frame may be split into three or more sub frames by multiplying the frame frequency of an incoming image signal by integer of 3 or more. With this being the case, the ratio between the sub frame(s) displaying luminance components with a priority and the sub frame(s) displaying color-difference components with a priority may be defined based on display images or viewing environment. As such, when there are a plurality of sub frames displaying the luminance components with a priority or/and the color-difference-components with a priority, it is considered preferable to continuously display the sub frames displaying the luminance-components with a priority or the color-difference components with a priority in terms of display properties. For example, in the above embodiments, a single frame is split into a plurality of sub frames by multiplying by integer. This is surely not restrictive, a single frame may be split into a plurality of sub frames by multiplying a frame frequency (for example multiplying a frame frequency 1.5 time).

What is more, the projector including the image display device of the second embodiment carries rotating spectral filters for each of the color lights. Such a configuration is surely not restrictive, and the rotating spectral filter is not necessarily provided to every color lights.

Figure 7:
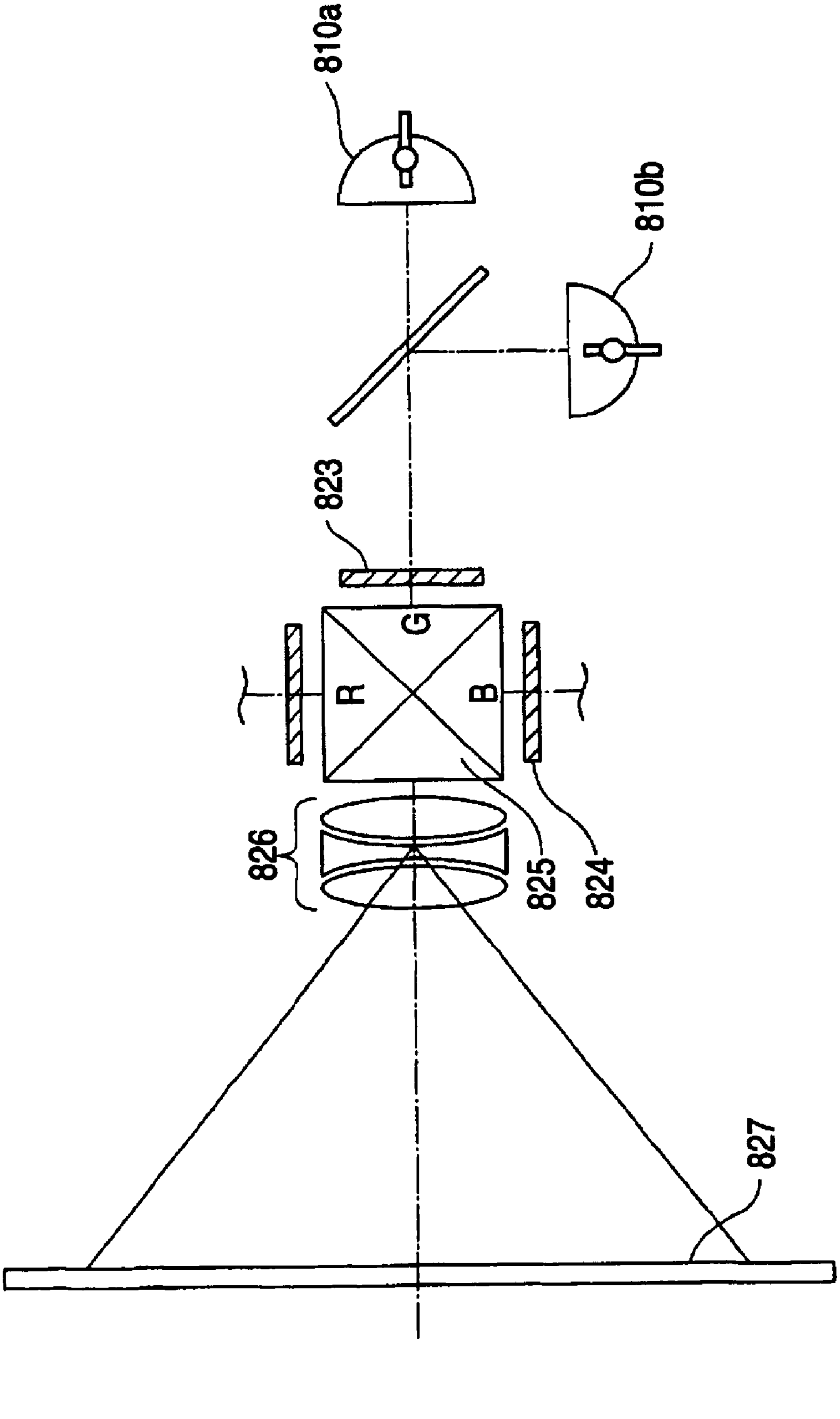
FIG. 7 is a diagram showing the schematic configuration of a modified projector of an embodiment of the invention.
Figure 8:
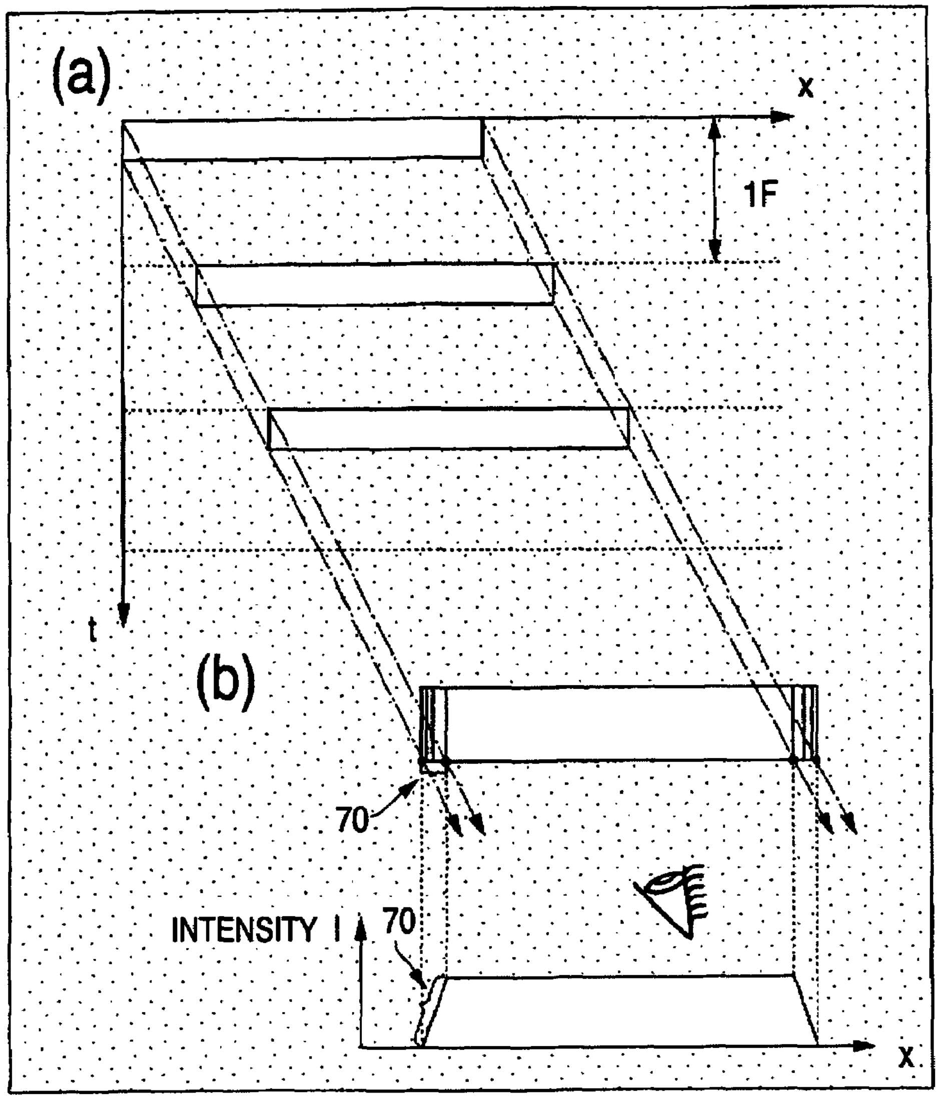
FIG. 8 shows an exemplary impulse-type image display on a CRT (Cathode-Ray Tube) or others.
Figure 9:
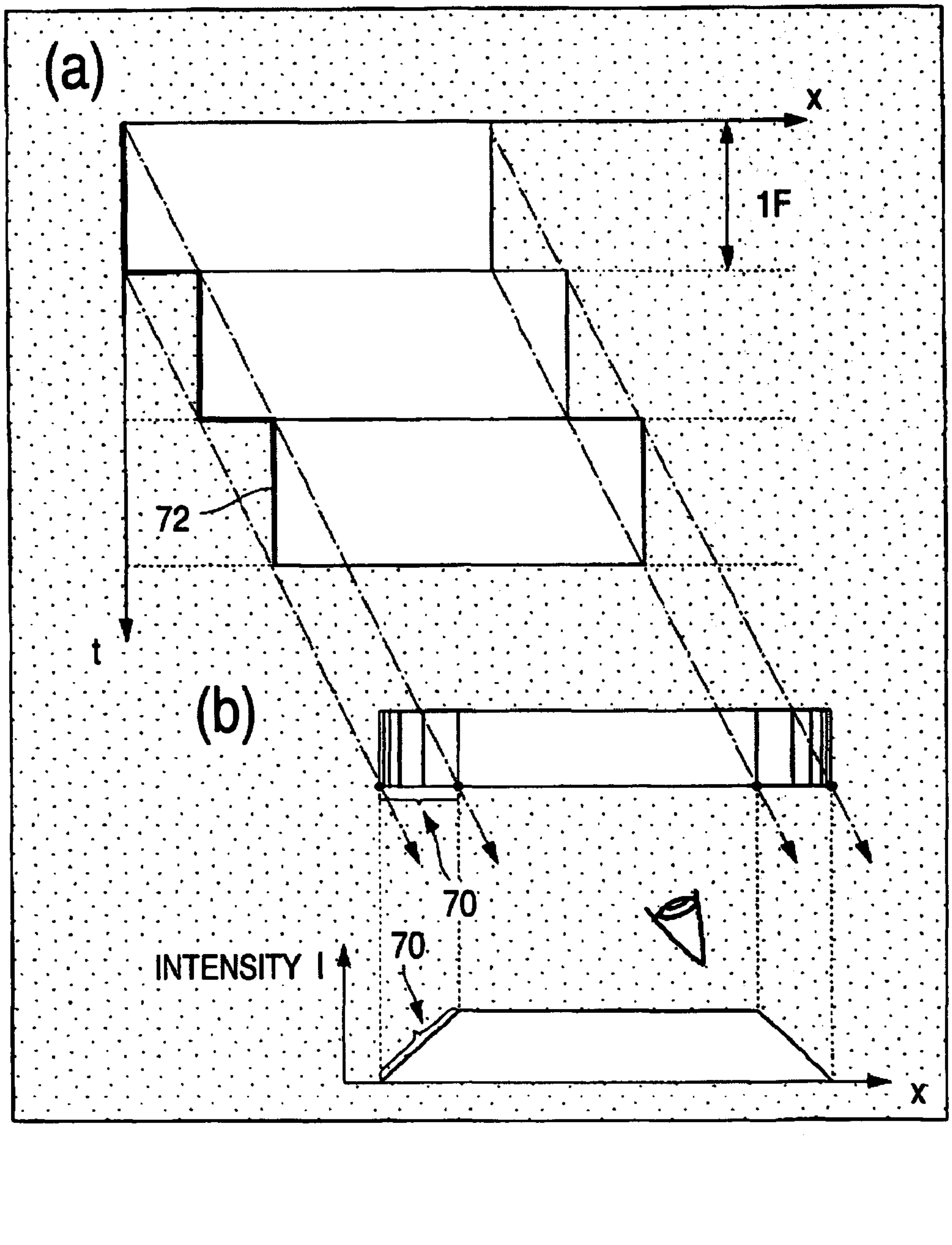
FIG. 9 shows an exemplary hold-type image display on an LCD (Liquid Crystal Display) or others.
Figure 10:
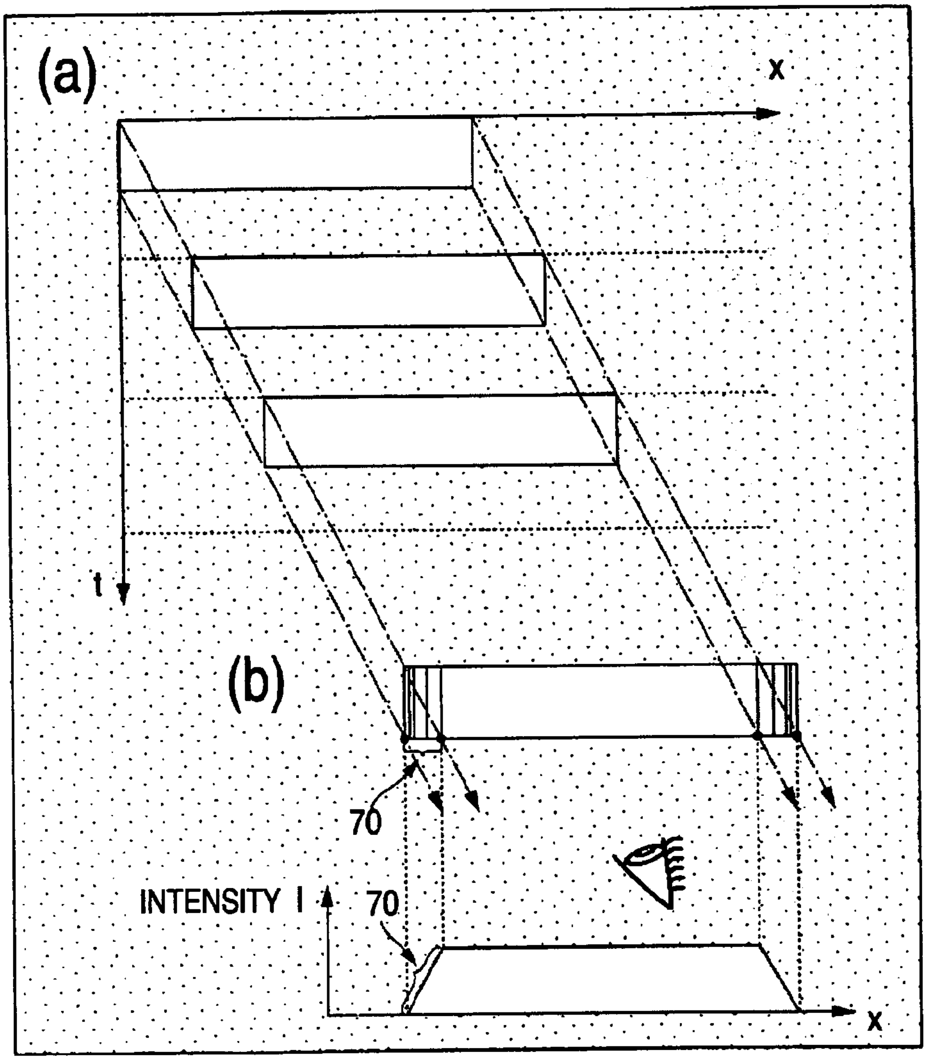
FIG. 10 shows an exemplary impulsive image display.
Figure 11:
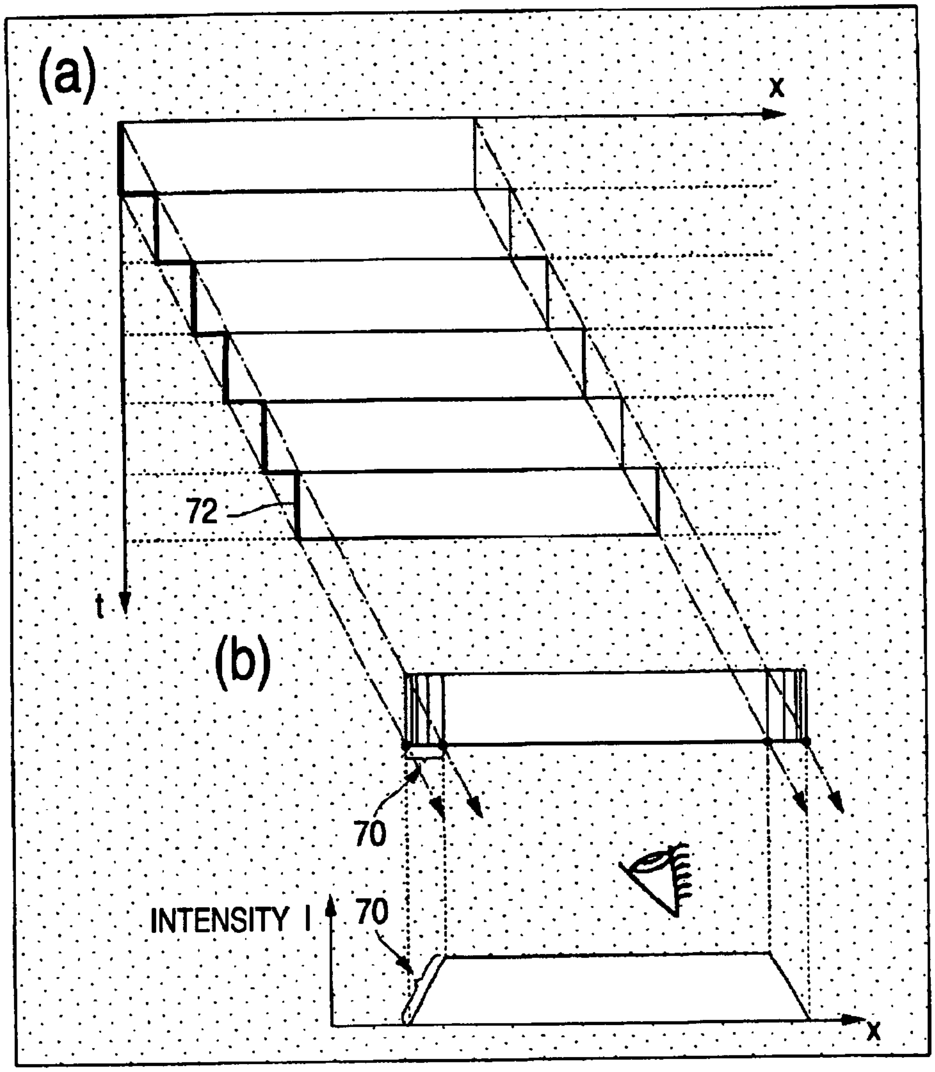
FIG. 11 shows an exemplary image display by inserting generated image signals between any consecutive input image signals.

In the projector provided with the image display device of the second embodiment, the first and second spectra are generated by rotating the rotating spectral filter, and switching between the first and second filters having each different spectral transmittance. This is surely not restrictive, and alternatively, two light sources may be provided to achieve the similar effects as the projector including the image display device of the second embodiment. More in detail, provided are a light source emitting the first spectrum including a high proportion of luminance components, and a light source emitting the second spectrum including a high proportion of color-difference components. These light sources are switched alternately for use. FIG. 7 is a diagram showing the schematic configuration of a projector including a first light source 810*a* emitting a first spectrum, and a second light source 810*b* emitting a second spectrum. Also in the projector configured as such, it becomes possible to free display images from motion blur streaks while preventing the signal processing load from increasing so that the display properties can be excellent. Here, if these two light sources are illuminated at the same time, the light will be much higher in luminance.

What is claimed is:

1. An image display method of splitting a frame into a plurality of sub frames, the method comprising:

multiplying a frame frequency of an incoming image signal by an integer;

dividing an image that is originally for the frame into pieces for display on the sub frames, wherein an intensity component included in the image is given a priority for display on a first sub frame that is at least one of the sub frames, and a color-difference component included in the image is given a priority for display on a second sub frame that is also one of the sub frames but not the first sub frame;

generating an intensity-component priority signal for a YCbCr original signal by converting an intensity component of the YCbCr signal into a RGB signal, replacing the intensity component of the YCbCr signal with 0, and converting a resulting 0CbCr signal into a R'G'B' signal; or generating the intensity-component priority signal for a RGB original signal by calculating a Y component or intensity from the RGB signal using the following equation: Y=0.299R+0.587G+0.144B, and generating an R'G'B' signal by subtracting the Y component from each of the components of the RGB signal;

producing the intensity-component priority signal, based on a signal derived by subtracting an R'G'B' signal from an RGB signal, wherein the RGB signal includes both intensity components and color-difference components, and the R'G'B' signal includes only the color-difference components in which the intensity-components are replaced by 0; and generating a color-difference-component priority signal based on the R'G'B' signal, which includes only color-difference components with intensity components replaced by 0.

2. The image display method according to claim 1, wherein when an intensity of the image displayed on the first sub frame is of a maximum displayable tone or higher, the intensity component exceeding the maximum tone is put under the charge of the second sub frame.

3. An image display device, comprising:

a frame converter that splits a frame into a plurality of sub frames by multiplying a frame frequency of an incoming image signal by an integer; and a display device that divides an image that is originally for the frame into pieces for display on the sub frames, wherein the image display device further includes a selection unit that makes the display device display an intensity component included in the image with a priority for display on a first sub frame that is at least one of the sub frames, and makes the display device display a color-difference component included in the image with a priority for display on a second sub frame that is also one of the sub frames but not the first sub frame, and a signal processor unit that generates an intensity-component priority signal and a color-difference-component priority signal, wherein the signal processor unit generates the intensity-component priority signal for a YCbCr original signal by converting an intensity component of the YCbCr signal into a RGB signal, replacing the intensity component of the YCbCr signal with 0, and converting a resulting 0CbCr signal into a R'G'B' signal, wherein the signal processor unit generates the intensity-component priority signal for a RGB original signal by calculating an intensity component from the RGB original signal using the following equation: Y=0.299R+0.587G+0.144B, and generating an R'G'B' signal by subtracting the Y component from each of the components of the RGB signal, wherein the signal processor unit produces the intensity-component priority signal, based on a signal derived by subtracting an R'G'B' signal from an RGB signal, wherein the RGB signal includes both intensity components and color-difference components, and the R'G'B' signal includes only the color-difference components in which the intensity-components are replaced by 0, and wherein the signal processor unit generates the color-difference-component priority signal based on the R'G'B' signal, which includes only color-difference components with intensity components replaced by 0.

4. The image display device according to claim 3, wherein the selection unit serves as a control section that divides the image signal into an intensity-component priority signal including a high proportion of an intensity component, and a color-difference-component priority signal including a high proportion of a color-difference component, supplies the intensity-component priority signal to the display device in the first sub frame that is at least one of the sub frames, and supplies the color-difference-component priority signal to the display device in the second sub frame that is also one of the sub frames but not the first sub frame.

5. The image display device according to claim 4, wherein when the intensity of the image displayed on the first sub frame is of a maximum displayable tone or higher, the control section adds the intensity component exceeding the maximum tone to the color-difference-component priority signal.

6. The image display device according to claim 3, wherein the display device serves as an illumination light modulation display device that displays the image through modulation of illumination light, and the selection unit includes:

a filter that has an intensity-component priority region in which an intensity component of the illumination light is guided with a priority, and a color-difference-component priority region in which a color-difference component of the illumination light is guided with a priority; and a drive section that drives the filter to make the intensity-component priority region or the color-difference-component priority region of the filter guide the illumination light based on the sub frames.

7. A projector that includes the image display device of claim 3.

* * * * *

UNITED STATES PATENT AND TRADEMARK OFFICE
CERTIFICATE OF CORRECTION

PATENT NO. : 7,649,574 B2
APPLICATION NO. : 11/296358
DATED : January 19, 2010
INVENTOR(S) : Takashi Toyooka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Twenty-eighth Day of December, 2010

David J. Kappos
*Director of the United States Patent and Trademark Office*